United States Patent [19]
Grasselli

[11] Patent Number: 5,510,685
[45] Date of Patent: Apr. 23, 1996

[54] ELECTRIC MOTOR CONTROL BASED ON CONDUCTIVE CONTACT OF MACHINE COMPONENT WITH OPERATOR FOR INJURY PREVENTION

[76] Inventor: Giorgio Grasselli, Via Roversi, 2-42020, Albinea (Reggio E.), Italy

[21] Appl. No.: 279,298

[22] Filed: Jul. 22, 1994

[30] Foreign Application Priority Data

Jul. 29, 1993 [IT] Italy ................................. 93000060 U

[51] Int. Cl.⁶ .................................................. H02P 3/00
[52] U.S. Cl. ............................ 318/434; 318/551; 361/23; 192/130
[58] Field of Search ..................... 318/280–286, 318/268, 272, 434, 551, 459; 361/23, 28, 29, 30, 31, 33, 42–50, 93–97; 452/127; 192/116.5, 127, 125 A, 129 R, 130, 131 R, 131 H, 138, 139

[56] References Cited

U.S. PATENT DOCUMENTS

| | | | |
|---|---|---|---|
| H330 | 9/1987 | Burich et al. ........................ | 361/90 X |
| 2,978,084 | 4/1961 | Vilkaitis . | |
| 3,706,008 | 12/1972 | Kremer . | |
| 3,784,842 | 1/1974 | Kremer ..................................... | 307/92 |
| 3,785,230 | 1/1974 | Lokey . | |
| 3,912,973 | 10/1975 | Young ..................................... | 361/223 |
| 3,953,770 | 4/1976 | Hayashi . | |
| 4,075,961 | 2/1978 | Harris ..................................... | 112/277 |
| 4,222,658 | 9/1980 | Mandel ................................. | 354/354 |
| 4,321,925 | 3/1982 | Hoborn et al. .......................... | 361/224 |
| 4,727,452 | 2/1988 | Brownlee . | |
| 4,965,909 | 10/1990 | McCullough et al. ...................... | 17/21 |
| 5,025,175 | 6/1991 | Dubois, III . | |
| 5,036,309 | 7/1991 | Dennison, Jr. ............................ | 128/897 |
| 5,083,973 | 1/1992 | Townsend ................................ | 452/127 |
| 5,120,980 | 6/1992 | Fontaine . | |
| 5,198,702 | 3/1993 | McCullough et al. ................... | 307/116 |
| 5,201,684 | 4/1993 | DeBois, III ............................. | 452/127 |
| 5,212,621 | 5/1993 | Panter . | |
| 5,408,186 | 4/1995 | Bakhoum ................................ | 361/212 |

FOREIGN PATENT DOCUMENTS

| | | |
|---|---|---|
| 0445860 | 9/1991 | European Pat. Off. . |
| 9105113 | 9/1991 | Germany . |
| 9219905 | 11/1992 | WIPO . |
| 9306733 | 4/1993 | WIPO . |

*Primary Examiner*—Jonathan Wysocki
*Attorney, Agent, or Firm*—Watts, Hoffmann, Fisher & Heinke, Co.

[57] ABSTRACT

A unit for controlling the operation of the electric motor is provided together with a control device, electrically connected to the body of the operator, to act on the control unit via a relay means in such a manner as to halt and reverse the rotation of the electric motor following conductive contact between the operator's body and the metal component. For receiving and supporting the feet of the operator, two conductive plates insulated from the ground are provided in such a position that the operator rests his feet via conductive shoes on them when working with the machine. The plates are connected to the control device, and the metal component is electrically connected to earth. The support plates are electrodes for the passage of low voltage electric current from one plate to the other via the body of the operator. The control device stops the motor following conductive contact between the operator's hands and the metal component.

19 Claims, 2 Drawing Sheets

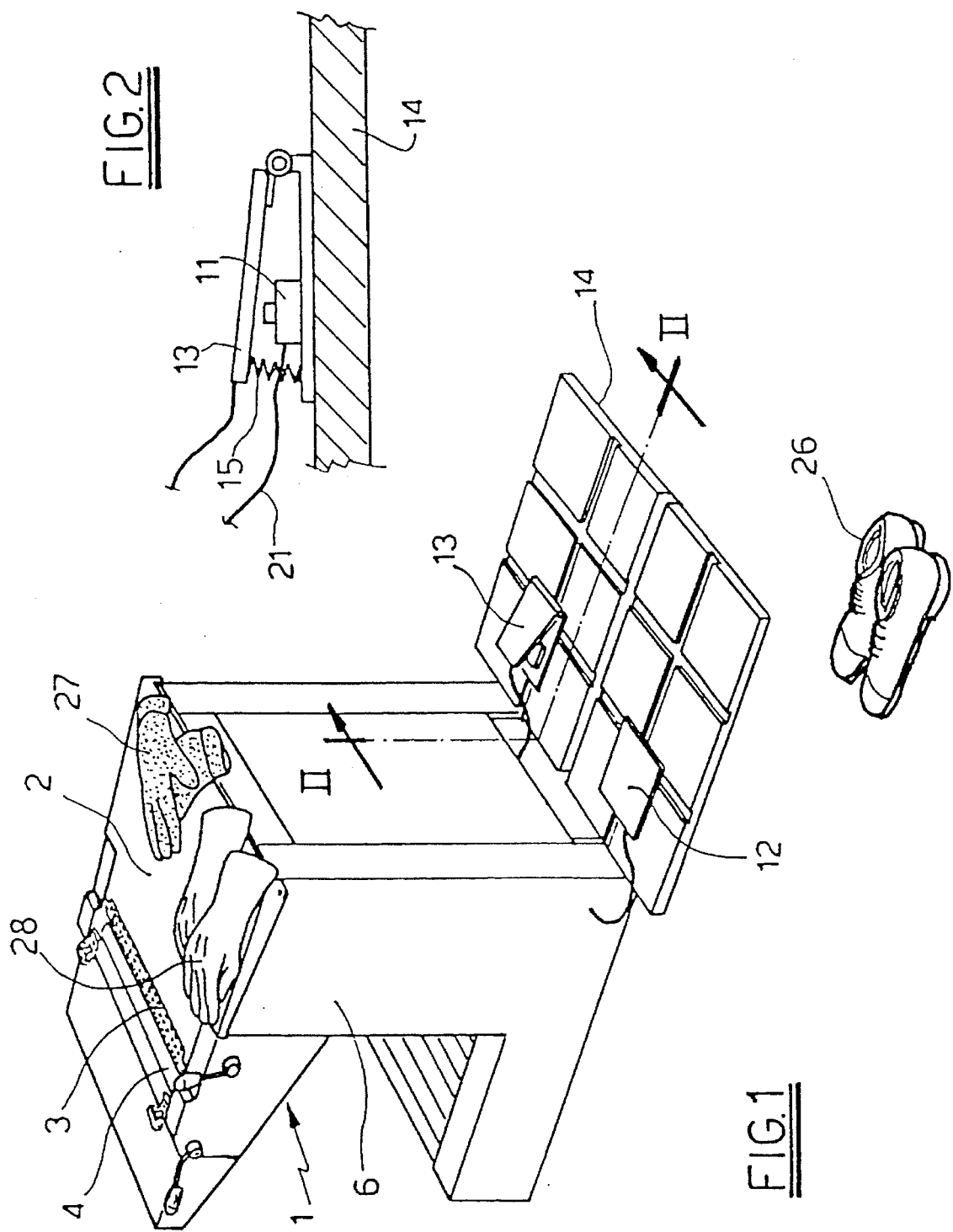

ELECTRIC MOTOR CONTROL BASED ON CONDUCTIVE CONTACT OF MACHINE COMPONENT WITH OPERATOR FOR INJURY PREVENTION

FIELD OF THE INVENTION

The invention relates to a safety system which is incorporated into a machine having at least one metal component moved by an electric motor, to protect the safety of the operator by immediately halting the movement of said metal component when contact occurs between the operator's hand or another part of his body and the metal component, or a machine part in the vicinity thereof.

In particular, the invention is applied to power machines which work on meat by means of a cutting tool operated by an electric motor, and in which the meat is manually manipulated by the operator, for example, in so-called flaying machines.

DESCRIPTION OF THE RELATED ART

A safety system for meat power machines of the aforesaid type is known which acts by immediately halting the motor operating the cutting tool when a metal glove worn by the operator, or the operator's bare hand, comes into contact with the tool or with another conductive part of the machine.

Said conducting metal glove is covered by an insulating sheath, such as a second glove of plastic sheet, to prevent electrical contact with the machine, for example, via the meat mass handled by the operator.

The operator's gloves or two conducting wristbands worn by him are electrically connected to a control device which controls a relay arranged to instantly disconnect the power when a glove or hand of the operator closes a circuit by touching a portion of the machine.

To further reduce the possibility of damage to the operator, the control system also comprises means for reversing the polarity of the electric motor to cause the motor to rotate in the opposite direction to its running direction for a fraction of a turn.

A manual switch is operated to restore the configuration of the safety system to its configuration prior to its action.

A system of this type is duly described in European patent application 89202438 (publication number EP 0362937).

In the aforesaid system the operator wears about his wrists two bands provided with electrodes which are connected, via electric wires provided with suitable plugs, to corresponding sockets provided in the body of the power machine.

Said two wires lead to a control device such as that illustrated in FIG. 6 of the said European patent application, which is housed in the machine base and acts on the electric machine operating unit illustrated in FIG. 5 of said patent application.

When the operator wears the two electrode wristbands, low voltage current passes from one band to the other via the operator's body. In addition the operator presses a manual switch by means of a pedal. When in this configuration, the control device enables the electric motor to rotate normally. When the operator involuntarily touches the cutting tool with his glove, the insulating outer layer of the glove is immediately torn, so that there is direct contact between the metal glove and the tool with the result that the characteristics of the current which previously passed through the electrodes change because the operator is now conductively connected to the metal tool.

The same happens if the operator touches the tool or another metal part of the machine with his bare hand.

This causes the control device to act to immediately halt the machine and produce a slight reverse rotation.

Although being extremely effective, said known safety system has however practical drawbacks relating to the fact that the operator has to wear the two wristbands which are connected by wires to the control device incorporated in the machine.

When the operator leaves the machine he is compelled to remove the wristbands or remove the wire plugs from their sockets, and has to take the reverse action when he returns to operate the machine. If such operations are repeated at relatively high frequency there is an obvious relatively large time wastage. In addition, said Wires connected to the wrists are uncomfortable and restrict the operator's movement.

In reality, with all these drawbacks the operator is tempted not to wear the wristbands.

In practice, it has been observed that a relatively large percentage of operators prefer not to wear the wristbands. This therefore inactivates the safety system, with obvious danger to operator safety.

DISCLOSURE OF THE INVENTION

The object of the present invention is to obviate the aforesaid drawbacks by means ,of a safety system of the aforedescribed type, comprising a control device electrically connected to the operator's body, to act on the electric motor control unit in such a manner as to halt and possibly reverse the rotation of the electric motor, in which the electrical connection between the control device and the operator's body does not require wires secured to the operator's body.

The present invention is based on the provision of two conductive plates on which the operator rests his feet and which are insulated from the ground, they being positioned such that when the operator is in his workplace he rests his feet on them when working with the machine. Shoes to be worn by the operator are also provided, which create conductive contact between the operator's feet and said support plates. The support plates are connected by respective electric wires to the control device, the metal component or other metal parts in the vicinity being electrically connected to earth. The support plates define two electrodes for low voltage electric current passage from one plate to the other via the operator's body, the control device immediately halting and possibly reversing the electric motor following notable change in the characteristics of the current passing through the operator's body as a result of conductive contact between the operator's hands and the metal component or other metal parts in the vicinity.

The operator is therefore totally independent of the machine and can move away from and towards it freely without having to take any particular action. He merely has to wear a pair of shoes with an electrically conducting sole, and with which he can obviously move freely anywhere. In addition when working with the machine he has to place his feet on the two support plates, which is no bother because the plates are obviously positioned in the most natural and comfortable points for receiving the operator's feet.

The invention is described in detail hereinafter with the aid of the accompanying figures, which illustrate one embodiment thereof.

BRIEF DESCRIPTION OF THE DRAWINGS

FIG. 1 is a general perspective view of the system according to the invention, incorporated into a power machine for meat, in particular a flaying machine;

FIG. 2 is a detail of FIG. 1 sectioned on the plane II—II; and

BEST MODE FOR PRACTICING THE INVENTION

Figure 3:
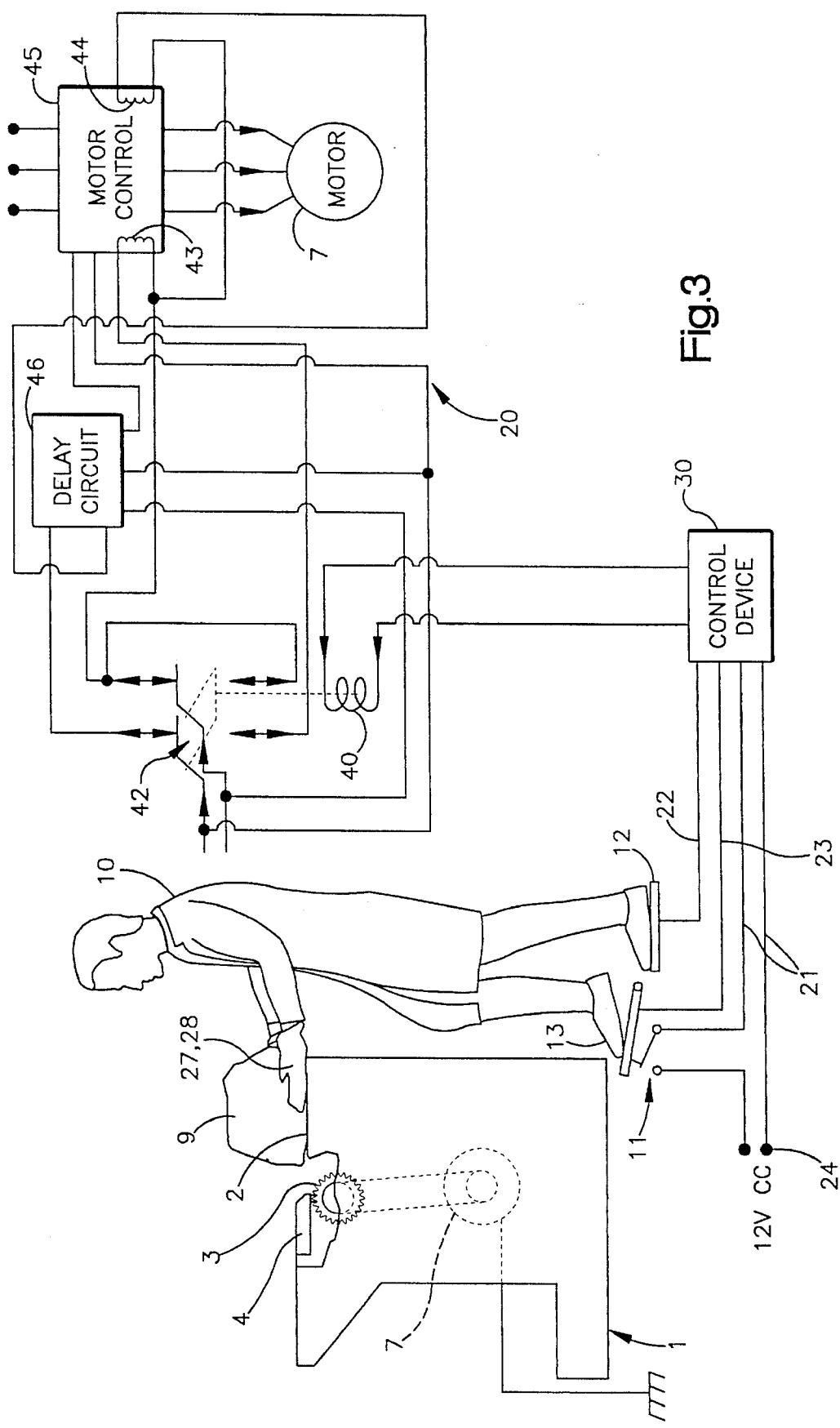
FIG. 3 is a schematic diagram showing the main circuit of the system.

FIG. 1 shows the safety system according to the invention applied to a flaying machine, indicated overall by 1, of the type comprising an upper horizontal work table 2 with which there is associated a rotary meat conveying roller 3 provided with numerous small teeth for gripping and dragging the meat. The roller 3 acts in combination with a fixed knife 4 with a horizontal blade which operates to separate the skin from the piece of meat 9 which is advanced by the roller 3. The machine 1 can be of the type manufactured by the company G. G. di Grasselli Giorgio & C. S.p.A. of Albinea (Reggio Emilia), Italy.

The machine 1 also comprises a structure 6 containing an electric motor 7 which is mechanically connected to the roller 3 for its rotation (FIG. 3).

The upper parts of the machine, in the vicinity of which the operator's hands move, i.e., the roller 3, the knife 4 and the work table 2, are connected electrically to earth.

This is achieved very simply by the usual earth connection of the electric motor and using metal elements for the machine to provide an uninterrupted chain of metal elements between the motor and said machine parts to be earthed.

This is generally already done in known machines.

Alternatively, said earth connection can be achieved by resting the metal structure 6 on the ground and not providing insulation between the structure 6 and said upper parts 2, 3 and 4.

The electric motor 7 is controlled by a manual switch 11 to be operated by the operator's foot.

The safety system of the invention comprises a control unit for operating the motor 7, indicated overall by 20 in FIG. 3, and a control device 30 electrically connected to the body of the operator 10 to act on the control unit 20 via a relay 40 so as to halt and reverse for a fraction of a revolution the rotation of the electric motor 7, and hence of the conveying roller 3, when conductive contact occurs between the body of the operator 10 and the roller 3 or another metal part in the vicinity thereto, such as the table 2 or the knife 4.

Said means 20, 30 and 40 are incorporated into the machine 1 and can be formed in various ways, their formation being obvious in light of the functions which they have to perform.

The illustrated unit 20 is substantially equal to that illustrated in FIG. 5 of said published patent EP 0362937.

The particular circuit shown is merely illustrative of one type, its method of operation being apparent to any expert of the art and is therefore not described in detail.

The relay 40 is controlled by the device 30 and operates a second relay 42 of double-pole double-contact type which acts on the circuit 45 of the motor 7, to reverse the polarity of the electric motor 7 by removing power from a winding 43 for normal motor running, and providing power to a winding 44 for reverse running.

Operation of the relay 42 also results in operation of a relay of a delay circuit 46 which removes power from the winding 44 after a very short time (about half a second) so as to halt rotation of the roller 3 after a fraction of a rearward revolution.

For again starting the motor 7, the circuit 46 requires the foot to be removed from the switch 11 before the motor 7 can be restarted.

According to the invention, two conductive plates 12 and 13, in particular of metal, are provided for receiving and supporting the feet of the operator 10, they being arranged on a footboard 14 of insulating material acting as the base of the station in which the operator 10 works. The plates 12 and 13 are positioned such that the operator 10 can rest his feet on them when working with the machine 1, and be in a natural and comfortable position. The two plates 12 and 13 are connected to the control device 30 by respective electric wires 22 and 23. The plate 13 can rock and acts on the switch 11 which is connected to the control device 30 by two wires 21. Specifically, the plate 13 acts as a pedal the downward movement of which closes the contact of the switch 11 between the two wires 21.

The control device 30 is connected to a source of low voltage electricity (12/24 V) by the wires 21 via the switch 11.

The operator 10 must wear a pair of shoes 26 which create conductive contact between his feet and the plates 12 and 13.

Advantageously, shoes 26 are provided having their sole formed of a special elastomer material of high electrical conductivity.

Because of said shoes, the operator 10 can move within the establishment in which he works as if he were wearing usual shoes with a rubber sole whereas at the same time, when standing on the plates 12 and 13, his body makes conductive contact with these plates.

The plates 12 and 13 define two electrodes arranged to create a passage of low voltage (12/24 V) current from one plate to the other via the body of the operator 10.

The control device 30 is arranged to act on the relay 40 such that this, via the unit 20, causes stoppage and reversal of the motor 7 when a notable change occurs in the current passing through the operator's body, this change being determined by the fact that the operator's hands (or another part of his body) have made contact with the metal component or with metal parts in the vicinity thereof.

Advantageously, the operator 10 wears a pair of gloves of knitted conductive material, such as steel wire, which serve both to protect his hands against cuts or other damage, and to increase the conductivity of the contact between the hand and the other metal parts of the machine. In this respect, if wearing the gloves 27, contact with the metal parts of the machine lasting only a very short time produces a very conductive contact between the body of the operator 10 and the machine. As the operator 10 handles pieces of meat 9 which are generally conductive, he has to wear other insulating gloves 28, such as gloves formed of a thin film of synthetic resin, over the gloves 27.

When the operator wishes to work with the machine 1, after putting on the shoes 26 and gloves 27 plus the gloves 28, he stands in his working position on the footboard and places one foot on the plate 12 and the other foot on the plate 13. On pressing the plate 13 the contact of the switch 11 is closed and the two plates 12 and 13 are put under voltage by the device 30. Consequently, the body of the operator 10 acts as a "conducting bridge" between the two plate electrodes 12 and 13 with the result that a current of very small intensity flows between them. When in this configuration, the device 30 acts on the relay 40 so that this, via the unit 20, operates the motor 7 in its normal direction of rotation. On removing his foot from the plate 13, the plate rises by the action of a spring 15, and the switch 11 opens its contact. This leads to stoppage of the motor 7 via the device 30, the relay 40 and the unit 20.

During normal machine operation the operator 10 does not touch cutting parts with his gloves 27, 28, and because of the insulating gloves 28 his body does not make conductive contact with the parts of the machine 1. The motor 7 consequently remains in normal operation.

If, however, a hand of the operator 10 touches a cutting part, such as the knife 4 or the conveying roller 3, this results in immediate tearing of the outer glove 28 (which is easily tearable) and contact between said cutting part and the conductive glove 27. As the body of the operator 10 is in contact with earth via said cutting part, this causes electric current to pass between one of the electrodes 12 (or 13) and earth instead of passing through the other electrode 13 (or 12). This hence produces a substantial variation in the current passing between the two electrodes 12 and 13, to cause the relay 40 of the device 30 to Operate and, via the unit 20, immediately reverse the rotation of the motor 7 and hence of the roller 3 for a small fraction of a revolution. This reverse rotation of the roller 3 serves to automatically release the end of the glove 27 which had been gripped and trapped between the roller 3 and knife 4.

To recommence machine working, after freeing contact between the glove and machine the foot has to be removed from the plate 13 and the switch 11 again pressed, as heretofore described.

The control device 30 can be formed in various different ways, its implementation being obvious to an expert of the art in the light of the aforestated functions to be performed. One embodiment of the device 30 can be easily obtained from FIG. 6 of the cited patent document EP 0362937, modified in that the electrodes fixed therein, to the operator's wrists are here replaced by the plate electrodes 12 and 13.

I claim:

1. An operator safety system for use in connection with a machine having a movably mounted metal component electrically coupled to ground and having an electric motor coupled to the component for moving said component, said system comprising:
    a) a control unit coupled for controlling operation of said electric motor; and
    b) a control apparatus electrically couplable between an operator and said control unit for acting upon said control unit in response to conductive contact between the operator and said component, said control apparatus comprising:
        i) two conductive members adapted for contact with respective feet of the operator;
        ii) circuitry for applying to said conductive members an electrical potential; and
        iii) circuitry for monitoring electrical current flow through the operator and for causing said control unit to alter operation of said electric motor in response to a predetermined change in said monitored current.

2. The system of claim 1, wherein:
    said control apparatus further includes circuitry for causing reversal of operation of said electric motor in response to said predetermined monitored current change.

3. The system of claim 1, further comprising:
    at least one electrically conductive shoe suitable for wearing by the operator and for contact with one of said conductive members.

4. The system of claim 1, further comprising:
    a footboard for supporting said conductive members and for providing insulation between said conductive members and ground.

5. The system of claim 1, wherein said control apparatus comprises:
    iv) a switch coupled for governing operation of said control apparatus; and
    v) one of said conductive members being movable for actuating said switch.

6. An apparatus for use with a machine having a motor controlled by a motor controller, the apparatus comprising:
    (a) a first conductive support plate for supporting and conductively coupling a first foot of an operator;
    (b) a second conductive support plate for supporting and conductively coupling a second foot of the operator; and
    (c) control circuitry coupled to at least one of the first and second conductive support plates and to the motor controller,
        (i) the control circuitry providing an electrical potential to one of the first and second conductive support plates such that current flows between the first foot of the operator and the second foot of the operator while the operator is supported by the first and second conductive support plates, and
        (ii) the control circuitry monitoring current from the at least one conductive support plate and controlling operation of the motor by the motor controller based on the monitored current.

7. The apparatus of claim 6, comprising:
    (d) a first conductive shoe to be worn on the first foot of the operator to conductively couple the operator to the first conductive support plate; and
    (e) a second conductive shoe to be worn on the second foot of the operator to conductively couple the operator to the second conductive support plate.

8. The apparatus of claim 6, wherein the control circuitry causes the motor controller to reverse operation of the motor based on the monitored current.

9. The apparatus of claim 6, wherein the first conductive support plate and the second conductive support plate are arranged on an insulating footboard.

10. The apparatus of claim 6, comprising a switch configured with the control circuitry and with the first conductive support plate such that the switch is activated to provide the electrical potential to one of the first and second conductive support plates when the operator steps on the first conductive support plate.

11. The apparatus of claim 6, in combination with the machine.

12. The apparatus of claim 6, wherein the machine has a conductive component electrically coupled to ground, and
    wherein the apparatus comprises a conductive glove to be worn by the operator to conductively couple the operator to the conductive component such that the monitored current varies.

13. The apparatus of claim 12, wherein the motor is coupled to the conductive component and wherein the motor moves the conductive component.

14. The apparatus of claim 13, wherein the conductive component includes a rotary conveying roller.

15. An apparatus comprising:
   (a) a machine having a motor, a motor controller for controlling operation of the motor, and at least one conductive component electrically coupled to ground, wherein the at least one conductive component includes a moveable component configured with the motor for movement by the motor;
   (b) a conductive piece of apparel to be worn by an operator to conductively couple the operator to the at least one conductive component;
   (c) a first conductive support plate for supporting and conductively coupling a first foot of the operator;
   (d) a second conductive support plate for supporting and conductively coupling a second foot of the operator; and
   (e) control circuitry coupled to the first and second conductive support plates and to the motor controller,
      (i) the control circuitry providing an electrical potential to one of the first and second conductive support plates such that current flows between the first foot of the operator and the second foot of the operator while the operator is supported by the first and second conductive support plates, and
      (ii) the control circuitry monitoring current between the first conductive support plate and the second conductive support plate and causing the motor controller to halt or reverse operation of the motor when the operator becomes conductively coupled to one of the at least one conductive component by the conductive piece of apparel.

16. The apparatus of claim 15, wherein the at least one conductive component of the machine includes a rotary conveying roller and a knife.

17. The apparatus of claim 15, comprising:
   (f) a first conductive shoe to be worn on the first foot of the operator to conductively couple the operator to the first conductive support plate; and
   (g) a second conductive shoe to be worn on the second foot of the operator to conductively couple the operator to the second conductive support plate.

18. The apparatus of claim 15, wherein the first conductive support plate and the second conductive support plate are arranged on an insulating footboard.

19. The apparatus of claim 15, comprising a switch configured with the control circuitry and with the first conductive support plate such that the switch is activated to provide the electrical potential to one of the first and second conductive support plates when the operator steps on the first conductive support plate.

* * * * *